United States Patent Office 2,804,445
Patented Aug. 27, 1957

2,804,445

SYNTHETIC RESINS DERIVED FROM HYDROXYMETHYLFURFURAL AND PARA-TOLUENE SULFONAMID

Francis H. Snyder, Newtown, Conn., assignor to Dendrol, Inc., Memphis, Tenn., a corporation of Delaware No Drawing. Application August 3, 1953,
Serial No. 372,171

5 Claims. (Cl. 260—72)

This invention relates to synthetic resins derived from hydroxymethylfurfural and p-toluene sulfonamid and to a process of preparing same.

In accordance with the invention it has been found that new and useful synthetic resins can be produced by the condensation of hydroxymethylfurfural with p-toluene sulfonamid. In carrying out the reaction equimolar concentrations of p-toluene sulfonamid and hydroxymethylfurfural are treated with sufficient sodium hydroxide, ammonia or similar type of alkaline material to give a pH between about 10 and 11. The mixture is then refluxed for about an hour, more or less, and is then neutralized with dilute acid, such as sulfuric, hydrochloric or the like. A black, sticky resin separates out which may be recovered, washed with hot water and thinned with 10 to 50 parts alcohol or acetone.

The resins formed in accordance with the process described are thermo-setting materials capable of cross-linking, upon the application of heat in the presence of a suitable catalyst, to form insoluble, infusible products of a highly complex nature. Such resins are highly useful in coatings, varnishes and as reinforcing agents in cellulose ester lacquers.

The resins produced in accordance with the invention have curing characteristics similar to the phenol novalacs since, although they do condense through the methylol groups, they are catalyzed or cross-linked when cured with hexamethylenetetramine. Cure without hexamethylenetetramine is catalyzed by acids, but only weakly by bases. These resins are soluble in the uncured state but, when cured, are insoluble in dilute mineral acids and most polar organic solvents. The cured resins have enormous alkali resistance and are compatible with phenolics to which they impart toughness, alkali resistance and oxidation resistance.

The resins herein described may be prepared from hydroxymethylfurfural, however derived, whether in a purified form or in the form of a crude solution such as the crude hydrolysate liquor obtained in the acid hydrolysis of wood, or other material containing or yielding hexoses. In such process, wood, or other hexose containing or yielding material, is subjected to high pressure, high temperature hydrolysis with steam, in the presence of an acid, and under conditions of temperature, pressure, time and pH, so controlled, as to give a crude hydrolysate liquor, the major component of which, aside from water, is hydroxymethylfurfural. Depending on the particular materials used, the crude hydrolysate liquor may also contain small quantities of other hydrolysis products such as sugars, formic acid, acetic acid, levulinic acid and so forth.

Such crude hydrolysate liquor has a pH below 3.0 and usually between about 2.5 and 2.9 and contains hydroxymethylfurfural in a concentration ranging from about 6 to 10 percent which may be increased, if desired, by evaporation of a portion of the water. This material is well adapted for use in the process of the present invention and, in fact, constitutes a preferred source of hydroxymethylfurfural, since it can be produced rather economically, and used in the crude form obtained without further purification or other treatment. It can be used in dilute form, as obtained from the reactor, or alternatively may be concentrated by evaporation of a portion of the water without appreciable loss of hydroxymethylfurfural.

The following example will serve to illustrate the invention. In this example, the hydroxymethylfurfural utilized was in the form of a crude hydrolysate liquor obtained by impregnating oak wood chips with 0.6 percent sulfuric acid solution followed by subjecting them to steam hydrolysis at a pressure of approximately 1000 pounds per square inch gauge for about 90 seconds.

Example 250 mls. of crude hydrolysate liquor having a pH between about 2.5 and 2.9 and containing approximately 5 grams of hydroxymethylfurfural was mixed with 6.8 grams of p-toluene sulfonamid and sufficient sodium hydroxide added to give a pH of 10.5. The mixture was then heated to boiling under reflux which was continued for 1 hour. The mixture was then neutralized with dilute sulfuric acid whereupon a black, sticky material separated out, was removed, and washed with hot water. This material was a thermo-setting resin which could be converted into insoluble, infusible products by the application of heat in the presence of a catalyst.

The term "hydrolysate liquor," as used in the claims, refers to the liquid product, including soluble dissolved solids, obtained in the manner hereinabove described, and either in the raw state, as obtained, or in a more concentrated state brought about by evaporation of a portion or all of the water.

The example herein given is for the purpose of illustration only and is not to be construed as limiting the invention, the scope of which is defined in the following claims.

I claim:

1. A process of preparing a synthetic resin which comprises heating aqueous hydroxymethylfurfural with p-toluene sulfonamid in substantially equi-molecular concentrations, at a pH between 10 and 11 until, upon neutralization with $H_2SO_4$, a thermosetting resin is separated out.

2. The process of preparing a synthetic resin which comprises obtaining an aqueous mixture of hydroxymethylfurfural and p-toluene sulfonamid in substantially equi-molecular concentrations, bringing the pH to between 10 and 11 with alkali, heating the mixture for a sufficient period of time so that, upon neutralization with dilute $H_2SO_4$, a thermosetting resin is thrown out, and neutralizing the mixture with a dilute solution of acid.

3. The process of preparing a synthetic resin which comprises reacting substantially equi-molecular amounts of p-toluene sulfonamid with hydrolysate liquor obtained by the steam hydrolysis of acid impregnated hexose-yielding material at elevated temperatures and pressures and under conditions of time and pH such that the major component of the liquor, aside from water, is hydroxymethylfurfural, the reaction taking place under heat and at a pH between about 10 and 11, until a thermosetting resin is obtained as indicated by precipitation of such a resinous mass upon neutralization with dilute $H_2SO_4$.

4. A synthetic resin comprising the reaction product of hydroxymethylfurfural and p-toluene sulfonamid, the reaction taking place between substantially equimolecular amounts of the reaction in an aqueous alkaline medium between pH 10 and 11, with heating until, upon neutralization with $H_2SO_4$, the desired thermosetting resin separates out.

5. A synthetic resin comprising the reaction product obtained by reacting p-toluene sulfonamid with hydrolysate liquor obtained by the steam hydrolysis of acid impregnated hexose-yielding material at temperatures and pressures and under conditions of time and pH such that the major component of the liquor, aside from water, is hydroxymethylfurfural, the reaction taking place with heating and between a pH of 10 and 11 until, upon neutralization with dilute sulfuric acid, a thermosetting resinous product is precipitated.

References Cited in the file of this patent

UNITED STATES PATENTS 1,840,596    Moss et al. _____ Jan. 12, 1932

OTHER REFERENCES

Walker: Formaldehyde, pub. by Reinhold Pub. Corp., New York (1953), page 172. (Copy in Division 50.)